US010671617B2

(12) United States Patent
Delattre

(10) Patent No.: US 10,671,617 B2
(45) Date of Patent: Jun. 2, 2020

(54) METHOD AND DEVICE FOR REFINING SELECTION OF ITEMS AS A FUNCTION OF A MULTICOMPONENT SCORE CRITERION

(71) Applicant: NINTENDO CO., LTD., Kyoto (JP)

(72) Inventor: Alexandre Delattre, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 293 days.

(21) Appl. No.: 15/402,469

(22) Filed: Jan. 10, 2017

(65) Prior Publication Data

US 2017/0199879 A1    Jul. 13, 2017

(30) Foreign Application Priority Data

Jan. 11, 2016  (EP) .................................. 16305018

(51) Int. Cl.
| | | |
|---|---|---|
| *G06F 16/2457* | (2019.01) | |
| *G06F 16/28* | (2019.01) | |
| *G06Q 10/06* | (2012.01) | |
| *G06Q 50/34* | (2012.01) | |
| *G06Q 50/00* | (2012.01) | |
| *A63F 13/795* | (2014.01) | |
| *A63F 13/798* | (2014.01) | |
| *G06F 17/11* | (2006.01) | |

(52) U.S. Cl.
CPC ...... *G06F 16/24578* (2019.01); *A63F 13/795* (2014.09); *A63F 13/798* (2014.09); *G06F 16/285* (2019.01); *G06F 17/11* (2013.01); *G06Q 10/06* (2013.01); *G06Q 50/01* (2013.01); *G06Q 50/34* (2013.01)

(58) Field of Classification Search
CPC .. G06F 16/24578; G06F 16/285; G06F 17/11; A63F 13/798; A63F 13/795; G06Q 50/34; G06Q 10/06; G06Q 50/01
See application file for complete search history.

(56) References Cited

U.S. PATENT DOCUMENTS

| | | | |
|---|---|---|---|
| 8,676,812 | B1 | 3/2014 | Wu et al. |
| 2003/0204502 | A1* | 10/2003 | Tomlin ................... G06F 17/12 |
| 2009/0018897 | A1* | 1/2009 | Breiter ............... G06Q 30/0203 |
| | | | 705/7.32 |

(Continued)

FOREIGN PATENT DOCUMENTS

EP    2 293 234    3/2011

OTHER PUBLICATIONS

Menke, A Bradley-Terry artificial neural network model for individual ratings in group competitions, pp. 175-186 (Year: 2007).*

(Continued)

*Primary Examiner* — Albert M Phillips, III
(74) *Attorney, Agent, or Firm* — Nixon & Vanderhye, P.C.

(57) ABSTRACT

The provided solution makes it possible to select one item from a set of items, a multicomponent score being associated with each item of the set of items. After having computed a value characterising a relation ranking between a first item of the set of items and a second item of the set of items, the computed value being computed as a function of a plurality of score components associated with the first and second item of the set of items, respectively, the first item or of the second item is selected based on the computed value.

22 Claims, 2 Drawing Sheets

(56) References Cited

U.S. PATENT DOCUMENTS

2016/0001186 A1* 1/2016 Marr ............... A63F 13/30
                                                463/40
2016/0199739 A1* 7/2016 Honda ............. G06Q 50/10
                                                463/42

OTHER PUBLICATIONS

Delalleau, Beyond Skill Rating: Advanced Matchmaking in Ghost Recon Online, pp. 167-177 (Year: 2012).*
Search Report for EP 16305018.0, dated Jun. 7, 2016, 7 pages.
Glickman, Mark E., et al., "Rating the Chess Rating System," 1999, 17 pages.
Herbrich, Ralf, et al., "TrueSkill™: A Bayesian Skill Rating System," Jun. 2006, Microsoft Research, Technical Report MSR-TR-2006-80, 10 pages.

* cited by examiner

METHOD AND DEVICE FOR REFINING SELECTION OF ITEMS AS A FUNCTION OF A MULTICOMPONENT SCORE CRITERION

PRIORITY CLAIM/INCORPORATION BY REFERENCE

This application claims the benefit under 35 U.S.C. § 119(a)-(d) of European Patent Application No. 16305018.0, filed on Jan. 11, 2016 and entitled "Method And Device For Refining Selection Of Items As A Function Of A Multicomponent Score Criterion". The above cited patent application is incorporated herein by reference in its entirety.

TECHNICAL FIELD

Embodiments of the disclosure relate to selection of one or more items from a set of items and in particular to a method and a device for refining selection of items from a set of items as a function of a multicomponent score criterion associated with each item of the set of items.

BACKGROUND

Matchmaking is the process of matching two people together or two sets of people together, for example in the context of sporting events or in online gaming. Such a process may be of particular importance in numerous contexts. For the sake of illustration, the selection of a gamer to compete with another gamer should be carefully made. If the game level of the selected gamer is too low, the other gamer will not enjoy playing the game and, on the contrary, if the game level of the selected gamer is too high, the other gamer can be frustrated.

Such processes may also be used for preselecting items as a result of selecting a first item, for example to suggest goods to be bought online after having selected first goods. They are particularly useful when a huge amount of items can be selected and when the selection mechanisms are implemented in devices such as smartphones having small displays.

A well-known matchmaking process is based on the Bradley-Terry model that uses a score assigned to each individual or each team. According to this model, it is possible to predict the outcome of a comparison of items based on a score associated with each of these items. For the sake of illustration, the probability that an individual i wins a game against an individual j, a score $S_i$ being assigned to individuals i and j, respectively, can be defined as follows:

$$P(i > j) = \frac{S_i}{S_i + S_j}$$

The score denoted $S_k$ that represents the skill of individual k can be determined based on the number of times individual k has won a match.

While the Bradley-Terry model is used for gaming it can also be used in numerous applications such as applications for ranking the relevance of documents in a searching process.

There exist a lot of processes for computing skills of individuals. Among these processes, the ELO rating system is a method for determining the relative skill levels of players such as chess players. The difference of skills between players is used to predict match results. According to the ELO rating system, the winner takes points from the loser after each match. The difference between the ratings of the winner and loser determines the number of points to be won and lost so that the rating system is self-correcting.

However, although these matchmaking algorithms may have been proven to be useful in numerous applications, they have drawbacks resulting from their transitive property according to which if an individual i is ranked above an individual j and if an individual j is ranked above an individual k, then individual i is ranked above an individual k.

Since there are many applications in which it is requested to select at least one item from among a set of items based on scores associated with the items, there is a need for nontransitive matchmaking processes and nontransitive ranking processes.

SUMMARY

Various embodiments described herein have been devised to address one or more of the foregoing concerns.

In this context, nontransitive matchmaking processes are provided.

According to a first object of the invention, a method for selecting at least one item from a set of items, a multicomponent score being associated with each item of the set of items, is provided. This method comprises the steps of for at least a first item and a second item of the set of items,
computing a value characterising a relative ranking relation between the first item and the second item of the set of items,
the value being computed as a function of a plurality of score components associated with each of the first item and the second item;
the selection being based on the computed value.

Therefore, the method of the invention makes it possible, in particular, to refine selection and/or ordering of items as a function of multicomponent scores associated with the items, on a non-transitive basis. The computed value may represent a probability that the first item wins or loses against the second item according to a criterion represented by the multicomponent scores.

In an embodiment, the selection is further based on at least one predetermined threshold.

In an embodiment, the method further comprises a step of ranking the first item and the second item as a function of the computed value.

In an embodiment, the multicomponent score associated with each item of the set of items comprises at least three components.

In an embodiment, a score function used to compute the computed value is such that relations between items of the set of items, as characterized by computed values, are non-transitive. Such a score function (denoted f for example) is such that it may exist three items A, B, and C of the set of items, having multicomponent scores $S_A$, $S_B$, and $S_C$, fulfilling the following criteria:

$f(S_A, S_B) > f(S_B, S_A)$ and $f(S_B, S_C) > f(S_C, S_B)$ and $f(S_C, S_A) > f(S_A, S_C)$ In an embodiment, the score function is chosen among the following score functions:

$$S_{(A,B)} = \frac{1}{m}\left(\sum_{j=1}^{m} \frac{S_B^j}{S_A^j + S_B^j}\right);$$

$$S_{(A,B)} = \sum_{j=1}^{m} \frac{S_B^j}{S_A^j}; \text{ and}$$

$$S_{(A,B)} = \sum_{j=1}^{m} e^{S_B^j - S_A^j};$$

wherein the multicomponent score associated with each item of the set of items comprises m components, $S_A^j$ representing component j of the multicomponent score associated with the first item, $S_B^j$ representing component j of the multicomponent score associated with the second item, and $S_{(A,B)}$ representing the computed value.

In an embodiment, the method further comprises a step of computing at least one other value characterizing a relative ranking relation between the first item and at least one other item of the set of items, the at least one other value being computed as a function of a plurality of score components associated with each of the first item and the at least one other item, respectively, the selection being based on the computed values.

In an embodiment, the method further comprises a step of choosing the set of items.

In an embodiment, at least one item of the set of items is a group of sub-items, a multicomponent score being associated with each of the sub-items.

In an embodiment, the method further comprises a step of computing a multicomponent score associated with the group of sub-items, as a function of multicomponent scores associated with sub-items.

In an embodiment, the method further comprises a step of modifying a value of a component of a multicomponent score associated with a selected item and/or with an item that multicomponent score has been used to compute the computed value.

In an embodiment, at least one component of the multicomponent score associated with at least one of the items of the set of items varies over the time.

In an embodiment, the components of the multicomponent scores are non-discriminative components.

In an embodiment, the method further comprises a step of initializing a value of a component of a multicomponent score associated with one of the items of the set of items, the initialization step being based on values of components of multicomponent scores associated with items of the set of items.

According to a second object of the invention, a device comprising a processor is provided, the processor being configured for carrying out each step of the method described above.

Since parts of the present invention can be implemented in software, parts of the present invention can be embodied as computer readable code for provision to a programmable apparatus on any suitable carrier medium, and in particular a suitable tangible carrier medium or suitable transient carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

According to embodiments described herein, a score having several components is associated with each item of a set of items so that an item of this set can be chosen as function of its score and as a function of a score associated with another item.

All the components of a score which is associated with an item are non-discriminative components which means that the selection of an item cannot be based on the value of only one component and cannot be based on successive selections based on individual components.

For the sake of illustration, three individuals A, B, and C are considered, the score (or skills) denoted $S_A(S_A^1, S_A^2, S_A^3)$, $S_B(S_B^1, S_B^2, S_B^3)$, and $S_C(S_C^1, S_C^2, S_C^3)$, being associated with each of these individuals, respectively.

By choosing appropriately the values of the score components, it is possible to determine the order of the items so as to establish transitive or nontransitive relations between the items.

For example, if the score components of the individuals A, B, and C are chosen as follows, $$S_A(S_A^1, S_A^2, S_A^3)) = (0,1,2),$$

$$S_B(S_B^1, S_B^2, S_B^3) = (2,0,1), \text{ and}$$

$$S_C(S_C^1, S_C^2, S_C^3) = (1,2,0)$$

and if the model for computing the probability that an individual A wins against an individual B as a function of their score is the following, $$P_{A/B} = \frac{1}{3}\left(\frac{S_A^1}{S_A^1 + S_B^1} + \frac{S_A^2}{S_A^2 + S_B^2} + \frac{S_A^3}{S_A^3 + S_B^3}\right)$$

the probability that individual A wins against individual B is equal to the probability that individual B wins against individual C and to the probability that individual C wins against individual A. The value of this probability is 5/9.

More generally, a score associated with an item denoted A comprises a number m of non-discriminative components denoted $S_A^j$ (j varying from 1 to m). Accordingly, a matching probability (or rank value) between item A and item B can be expressed as follows:

$$P_{A/B} = \frac{1}{m}\left(\sum_{j=1}^{m} \frac{S_A^j}{S_A^j + S_B^j}\right)$$

According to particular embodiments, the number of components of each score is equal to or greater than three.

Figure 1:
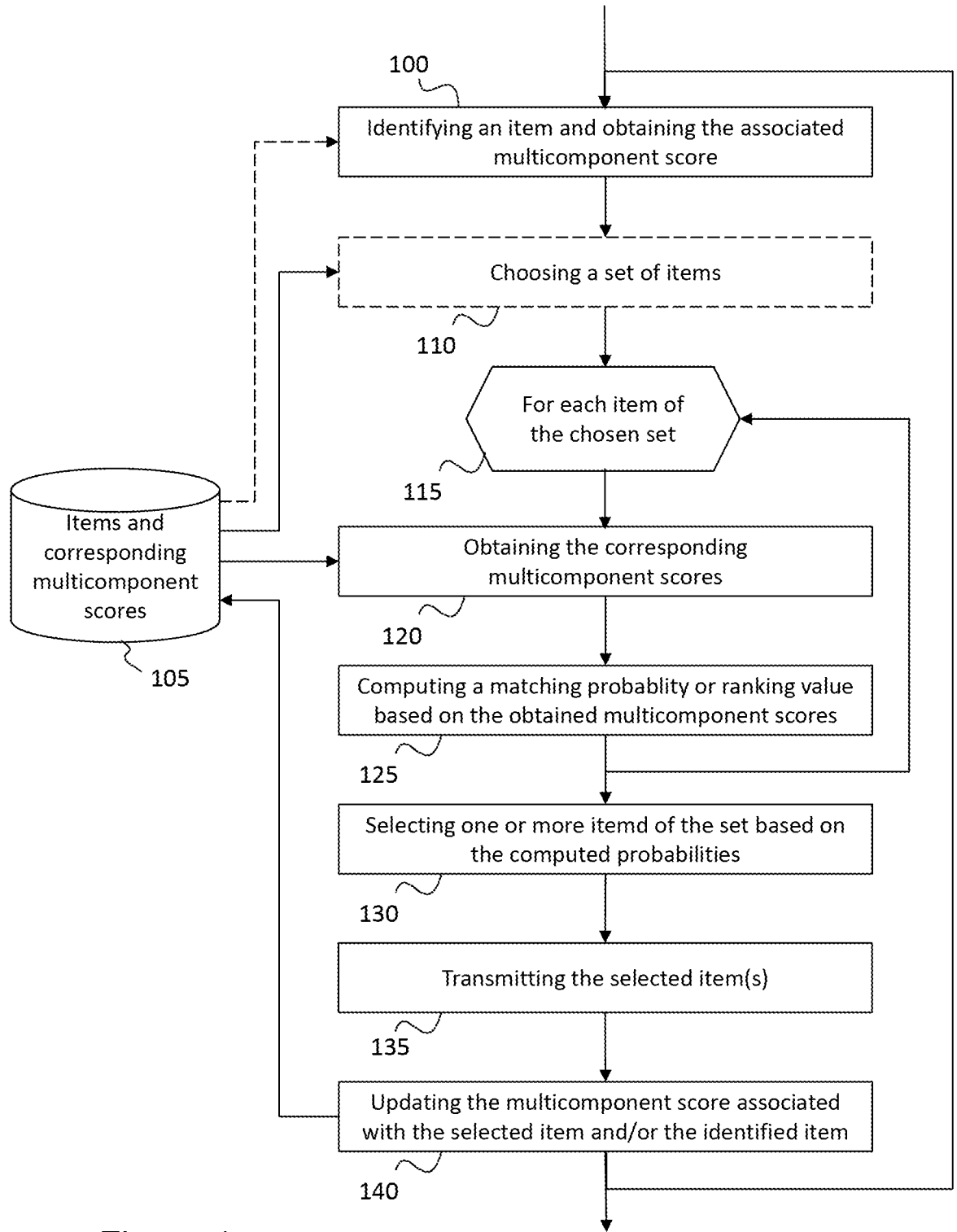
FIG. 1 illustrates an example of steps for selecting one or more items from a set of items as a function of multicomponent scores associated with the items, according to embodiments of the invention.

FIG. 1 illustrates an example of steps for selecting one or more items from a set of items as a function of multicomponent scores associated with the items, according to embodiments of the invention.

As illustrated, a first step is directed to identifying an item and obtaining the associated multicomponent score (step 100). The identified item may be an item selected from a database 105. According to particular embodiments, database 105 comprises items and a multicomponent score is associated with each item in the database. The identified item may also be an item defined by a user or an item identified by a user in a group of items, for example a group of locally or remotely preselected items.

According to particular embodiments, more than one item are identified. In such cases, the identified items can be processed one after the other or in a parallel way.

The identified item is an item to be compared with several items for the purpose of selecting one or more items from among the latter.

In a following step, a set of items is chosen (step 110). The set of items may be chosen from database 105. According to particular embodiments, all the items of database 105 are chosen as suggested by the dotted line of box 110. Alternatively, the chosen set of items is predetermined or defined by a user.

Next, all the items of the chosen set of items are processed (steps 115 to 125). It is to be understood that these items may be processed one after the other or in a parallel way.

As illustrated, for each item of the chosen set of items, the corresponding multicomponent score is obtained (step 120). The obtained multicomponent score of the processed item of the chosen set of items is used along with the multicomponent score of the identified item to compute a matching probability or a ranking value (step 125).

The multicomponent score associated with each item of the chosen set of items may be obtained from database 105.

The computed matching probability or ranking value depends on the application that uses the result of the steps illustrated in FIG. 1.

For the sake of illustration, if the application is a game, the computation may be directed to a probability that the identified item (which may represent an individual or a team of individuals) wins the game against the processed item. Likewise, if the application is directed to suggesting goods to buy, the computation may be directed to a probability that the identified item (which may represent goods that have been selected to be possibly bought) be preferred to be bought in comparison to the processed item.

In such a case, the matching probability denoted $P_{it_i/it_{sel}}$ associated with each item denoted $it_i$ of the selected set of items, associated with a multicomponent score denoted $S_i(S_i^1, S_i^2, S_i^3)$, in relation with an identified item $it_{sel}$, associated with a multicomponent score denoted $S_{sel}(S_{sel}^1, S_{sel}^2, S_{sel}^3)$, may be computed as follows, $$P_{it_i/it_{sel}} = \frac{1}{3}\left(\frac{S_i^1}{S_i^1+S_{sel}^1} + \frac{S_i^2}{S_i^2+S_{sel}^2} + \frac{S_i^3}{S_i^3+S_{sel}^3}\right)$$

According to another example, the computed ranking value represents the relevance of the processed item (which may represent a document) in view of the identified item. A ranking value may be computed like a matching probability.

After having processed all the items of the chosen set of items, that is to say after having computed a matching probability or a ranking value that establishes a relation between the identified item and each item of the chosen set of items, one or more items of the chosen set of items are selected based on the computed matching probabilities or ranking values (step 130).

Again, the way one or more items are selected depends on the application that uses the result of steps such as the one illustrated in FIG. 1.

According to particular embodiments, only one item is selected. This item may be the one whose corresponding matching probability or ranking value is the highest.

According to other particular embodiments, selection of items can be based on one or more thresholds, in particular one or more minimum thresholds and/or one or more maximum thresholds.

According to a first example, if it is considered that the scores associated with the items comprise three components, a minimum threshold denoted $T_m(T_m^1, T_m^2, T_m^3)$ and a maximum threshold denoted $T_M(T_M^1, T_M^2, T_M^3)$ may be used to select all the items denoted $it_i$ of the selected set of items, associated with the multicomponent score denoted $S_i(S_i^1, S_i^2, S_i^3)$, in relation with an identified item $it_{sel}$, associated with the multicomponent score denoted $S_{sel}(S_{sel}^1, S_{sel}^2, S_{sel}^3)$, such that:

$(T_m^1 \leq \|S_i^1 - S_{sel}^1\| \leq T_M^1)$ and $(T_m^2 \leq \|S_i^2 - S_{sel}^2\| \leq T_M^2)$ and $(T_m^3 \leq \|S_i^3 - S_{sel}^3\| \leq T_M^3)$ According to a second example, if it is considered that the scores associated with the items comprise three components, a minimum threshold denoted $T_m$ and a maximum threshold denoted $T_M$ may be used to select all the items denoted $it_i$ of the selected set of items, associated with the multicomponent score denoted $S_i(S_i^1, S_i^2, S_i^3)$, in relation with an identified item $it_{sel}$, associated with the multicomponent score denoted $S_{sel}(S_{sel}^1, S_{sel}^2, S_{sel}^3)$, such that:

$T_m \leq \frac{1}{3}(\|S_i^1 - S_{sel}^1\| + \|S_i^2 - S_{sel}^2\| + \|S_i^3 - S_{sel}^3\|) \leq T_M$ Still according to particular embodiments, the selection of one or more items from among the items of the chosen set of items can be based on a number of items to be selected and the computed matching probability or ranking value.

For the sake of illustration, such a selection may comprise a step of selecting a number n of items corresponding to the n items of the chosen set of items that are associated with the highest matching probabilities or ranking values.

It is to be noted that when several items are selected, they can be ranked as a function of their matching probability or ranking value to provide an ordered list of selected items (not illustrated). The ranking of items may also result directly from the selection of items.

The selected items are then sent to the application that called steps such as those illustrated in FIG. 1 (step 135).

As mentioned above, such applications can be directed to gaming (in such a case the steps illustrated in FIG. 1 aim at selecting a player to play against an identified player), for example online gaming, or at selecting a list of documents that are considered relevant in view of an identified document and possibly ranking these documents.

Next, the multicomponent score associated with the selected items and/or with the identified item are updated (step 140). As illustrated, the updated multicomponent scores may be stored in the database 105.

According to particular embodiments, one component of the selected item(s) or one component of the identified item is randomly selected and its value is incremented by a value determined as a function of the component value, for example 10%, and then decremented based on another ratio, for example 5%. Matching probabilities or ranking values are then computed for each of the two new component values and the one that improves prediction is set as the new value of the component.

Figure 2:
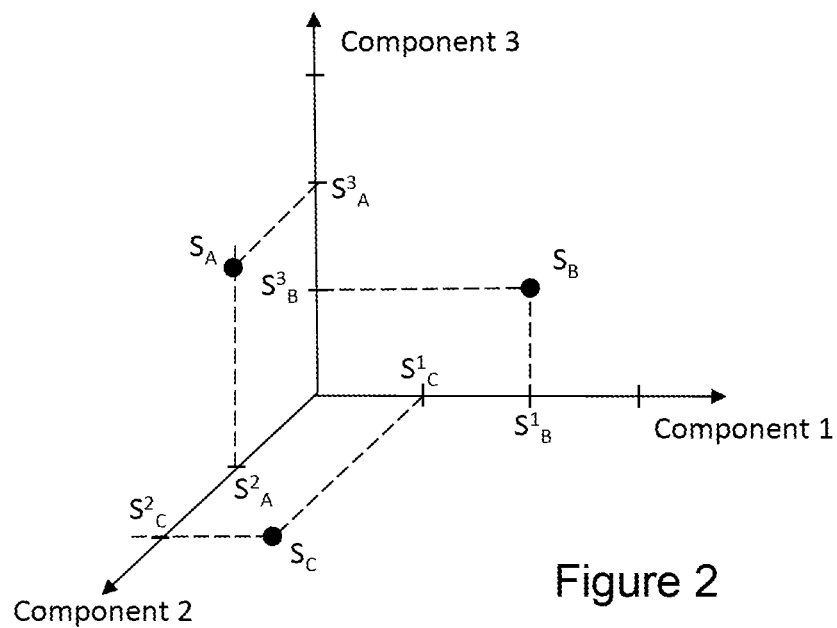
FIG. 2 illustrates a representation of multicomponent scores associated with three different items, that are represented in a three dimensional space.

FIG. 2 illustrates a representation of multicomponent scores associated with three different items, which are represented in a three dimensional space.

As illustrated, each axis of the three dimensional space represents one component of the multicomponent scores.

For the sake of illustration, the value of each component of the three items denoted A, B, and C are the following:

$$S_A(S_A^1, S_A^2, S_A^3)) = (0,1,2),$$

$$S_B(S_B^1, S_B^2, S_B^3) = (2,0,1), \text{ and}$$

$$S_C(S_C^1, S_C^2, S_C^3) = (1,2,0)$$

As a consequence, the Manhattan distance between each pair of items is the same.

Therefore, computing a matching probability according to the following formulae leads to the following nontransitive relations between these items:

$$P_{A/B} = \frac{1}{3}\left(\frac{S_A^1}{S_A^1 + S_B^1} + \frac{S_A^2}{S_A^2 + S_B^2} + \frac{S_A^3}{S_A^3 + S_B^3}\right)$$

$$P_{B/C} = \frac{1}{3}\left(\frac{S_B^1}{S_B^1 + S_C^1} + \frac{S_B^2}{S_B^2 + S_C^2} + \frac{S_B^3}{S_B^3 + S_C^3}\right)$$

$$P_{C/A} = \frac{1}{3}\left(\frac{S_C^1}{S_C^1 + S_A^1} + \frac{S_C^2}{S_C^2 + S_A^2} + \frac{S_C^3}{S_C^3 + S_A^3}\right)$$

According to particular embodiments, matching probabilities and/or ranking values may be computed for groups of items that are to be compared with each other, for example for teams of players.

In such a case, a multicomponent score may be assigned to each group of items (e.g. to each team). According to a particular example, if it is considered that a multicomponent score denoted $S_i^j$ is assigned to each item or individual i, wherein j represents a component index varying between 1 and n, of a group of items, the score denoted SG of the group of items comprising the items i (i varying between 1 and m), may be computed as follows:

$$SG = (SG^1, SG^2, \ldots, SG^n) = \left(\frac{1}{m}\sum_{i=1}^{m} S_i^1, \frac{1}{m}\sum_{i=1}^{m} S_i^2, \ldots, \frac{1}{m}\sum_{i=1}^{m} S_i^n\right)$$

A weight denoted $\alpha_i$ can be associated with each item of the group so as to take into account the role of the item in the group (e.g. the captain of the team in case of a gaming application). In such a case, the score of the group may be computed as follows:

$$SG = $$

$$(SG^1, SG^2, \ldots, SG^n) = \left(\frac{1}{m}\sum_{i=1}^{m} \alpha_i \cdot S_i^1, \frac{1}{m}\sum_{i=1}^{m} \alpha_i \cdot S_i^2, \ldots, \frac{1}{m}\sum_{i=1}^{m} \alpha_i \cdot S_i^n\right)$$

Then, the matching probability denoted $P_{Gi/Gsel}$ (or ranking value) associated with each group denoted Gi of a set of groups, associated with a multicomponent score denoted $SG_i(SG_i^1, SG_i^2, \ldots, SG_i^n)$, in relation with an identified group $G_{sel}$, associated with a multicomponent score denoted $G_{sel}(SG_{sel}^1, SG_{sel}^2, \ldots, SG_{sel}^n)$, may be computed as follows, $$P_{Gi/Gsel} = \frac{1}{n}\sum_{j=1}^{n} \frac{SG_i^j}{SG_i^j + SG_{sel}^j}$$

Still according to particular embodiments, the score associated with an item or with a group of items may vary over time.

For the sake of illustration, the variation of a component of a score, in a score update step, after a comparison has been made, may be higher for items or groups that are frequently involved (e.g. players that play frequently) and lower for items or groups that are rarely involved (e.g. players that stay for a long time without playing).

According to a particular example, only the last 100 comparisons (e.g. the 100 last games) may be taken into account for updating the corresponding score, with a linear weighting so that the result of the last of the comparisons is weighted 100, the previous one is weighted 99, and so on. To that end the history of the last 100 comparisons may be stored.

According to another example, the results of older comparisons may be weighted as a function of an exponential decay over time so that the results of the last of the comparisons are weighted 100, the results of comparisons made one month ago are weighted 50, the results of comparisons made two months ago are weighted 25, and so on.

Still according to another example, the variation of a score may vary as a function of a number of comparisons and of time.

Regarding scores associated with new items or groups of items, several solutions exist for initializing the values of a multicomponent score associated with an item or a group of items. For example, the values may be chosen randomly in a predetermined range (which may be expressed in percentage for the sake of illustration) such as [0%;15%] or [45%;55%].

Alternatively, initialization of the multicomponent score associated with an item or a group of items may be done in a dichotomic way. To that end, a first comparison may be made between the considered item or group and a "median" item or group, that is to say an item or group ranked close to the 50% centile of the whole item or group population. Then, a second comparison is done, as a function of the first comparison, so as to compare the considered item or group with an item or group close to 25% (as the median of [0%;50%]) or close to 75% (as the median of [50%;100%]). The results of the comparisons are used to compute the component values of the score and the process ends after a predetermined number of comparisons or when a predetermined matching probability or ranking value threshold is reached.

As mentioned previously, the processes described above may be used for ordering suggested items such as goods in online selling applications. In such a case, after a user has identified one item, for example goods to be possibly bought, a set of items is chosen and the items of this set are ordered. This set of items may be chosen by the user or may be determined automatically, for example as a function of a type of the item that has been identified by the user or as a function of a type of items that has been previously selected. Such a set of items may also be determined according to other standard algorithms, for example algorithms based on user's habits or user's preferences.

Ordering the items of the set of items may be done by comparing a multicomponent score associated with the identified item with a multicomponent score associated with each item of the set of items as described previously or by comparing a multicomponent score associated with each item of the set of items as described previously with each other.

Again, the multicomponent scores associated to items may be updated as described above as a result of the selection of an ordered (or preselected) item.

Using the processes described above in such types of applications makes it easier for a user to identify a preselected item among a set of items since items are ordered according to the probabilities they are selected. This is particularly helpful when selection is done on devices having small screens that allow to display only low numbers of item references.

Figure 3:
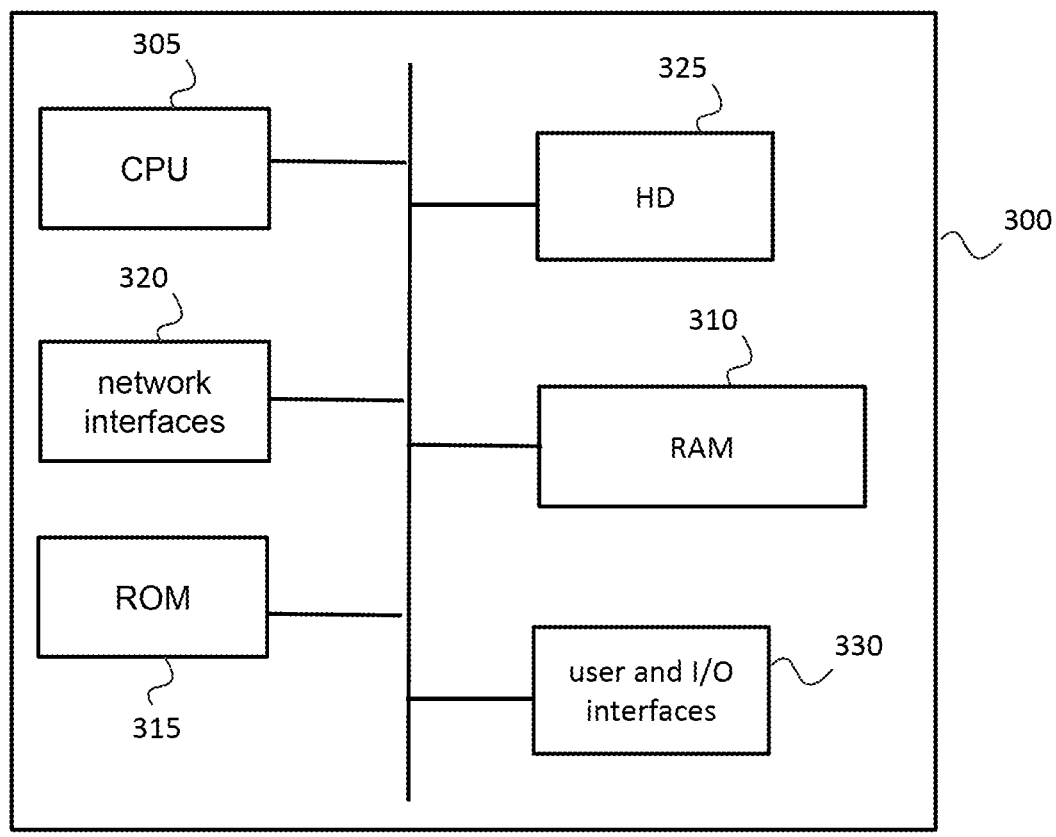
FIG. 3 is a schematic block diagram of a computing device for implementation of one or more embodiments of the invention, for example the steps described by reference to FIG. 1.

FIG. 3 is a schematic block diagram of a computing device 300 for implementation of one or more embodiments of the invention, for example the steps described by reference to FIG. 1.

Computing device 300 comprises a communication bus connected to:

a central processing unit 305, such as a microprocessor, denoted CPU;

a random access memory 310, denoted RAM, for storing the executable code of the method of embodiments of the invention as well as the registers adapted to record variables and parameters necessary for implementing the method for obtaining images according to embodiments of the invention, the memory capacity of which can be expanded by an optional RAM connected to an expansion port for example;

a read only memory 315, denoted ROM, for storing computer programs for implementing embodiments of the invention; and a network interface 320 typically connected to a communication network over which digital data can be transmitted or received. The network interface 320 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 305.

Optionally, the communication bus of computing device 300 may be connected to:

a hard disk 325 denoted HD used as a mass storage device; and/or a user interface and/or an input/output interface 330 which can be used for receiving inputs from a user, displaying information to a user, and/or receiving/sending data from/to external devices.

The executable code may be stored either in read only memory 315, on hard disk 325 or on a removable digital medium such as for example a disk. According to a variant, the executable code of the programs can be received by means of a communication network, via the network interface 320, in order to be stored in one of the storage means of the communication device 300, such as hard disk 325, before being executed.

Central processing unit 305 is adapted to control and direct the execution of the instructions or portions of software code of the program or programs according to embodiments of the invention, the instructions being stored in one of the aforementioned storage means. After powering on, CPU 305 is capable of executing instructions from main RAM memory 310 relating to a software application after those instructions have been loaded from ROM 315 or from hard-disc 325 for example. Such a software application, when executed by CPU 305, causes the steps of the algorithms herein disclosed to be performed.

Any step of the algorithm herein disclosed may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In particular, the matching probability or the ranking value ($P_B$) that item B wins against item A (or that item B should be ranked higher than item A) may be computed according to the following formula:

$$P_B = \sum_j f^j(S_A^j, S_B^j)$$

wherein, the multicomponent score associated with item A and item B comprises m components, $S_A^j$ and $S_B^j$ represent component j of the multicomponent score associated with item A and item B, respectively, and $f^j$ is a monotonic function.

For the sake of illustration, the used monotonic function may be one of the followings:

$$f^j(S_A^j, S_B^j) = \frac{S_B^j}{S_A^j + S_B^j}$$

$$f^j(S_A^j, S_B^j) = \frac{S_B^j}{S_A^j}$$

$$f^j(S_A^j, S_B^j) = e^{S_B^j - S_A^j}$$

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for selecting at least one player from a set of players to play a game, a multicomponent score being associated with each player of the set of players, the method comprising:

for a first player of the set of players, computing, by a processor connected to a memory, a first value based on both (a) a multicomponent score associated with the first player and (b) a multicomponent score associated with a second player different from the first player, the processor computing the first value as a function of at least three components of the multicomponent scores associated with the first player and the second player, for the second player of the set of players, computing, by the processor connected to the memory, a second value based on both (a) the multicomponent score associated with the second player and (b) a multicomponent score associated with a third player different from the first and second players, the processor computing the second value as a function of at least three components of the multicomponent scores associated with the second player and the third player, the first and second values representing non-transitive ranking relations between the first player, the second player and the third player of the set of players; and selecting, based on the computed first and second values, between players of the set of players to play a game.

2. The method of claim 1 wherein the selection is further based on at least one predetermined threshold.

3. The method of claim 1 further comprising a step of ranking the players of the set of players as a function of the computed first and second values.

4. The method of claim 1 wherein a score function used to compute the first and second values is chosen among the following score functions:

$$S_{(A,B)} = \frac{1}{m}\left(\sum_{j=1}^{m} \frac{S_B^j}{S_A^j + S_B^j}\right);$$

$$S_{(A,B)} = \sum_{j=1}^{m} \frac{S_B^j}{S_A^j}; \text{ and}$$

$$S_{(A,B)} = \sum_{j=1}^{m} e^{S_B^j - S_A^j};$$

wherein the multicomponent score associated with each player of the set of players comprises m components, $S_A^j$ representing component j of the multicomponent score associated with one players, $S_B^j$ representing component j of the multicomponent score associated with another player, and $S_{(A,B)}$ representing a computed value.

5. The method of claim 1, wherein the selection includes selecting, based on the computed first and second values, between the first player and the third player to play the game with the second player.

6. The method of claim 1 further comprising a step of choosing the players for the set of players based on a user selecting.

7. The method of claim 1 further comprising a step of modifying a value of a component of a multicomponent score associated with a selected player(s).

8. The method of claim 1 wherein at least one component of the multicomponent scores associated with the players of the set of players varies over time.

9. The method of claim 1 wherein the components of the multicomponent scores are non-discriminative components.

10. The method of claim 1 further comprising a step of initializing a value of a component of a multicomponent score associated with one of the players of the set of player, the initialization step being based on values of components of multicomponent scores associated with the players of the set of players.

11. The method of claim 1 wherein a plurality of players are selected from the set of players and the method further comprises ranking the selected players based on the computed first and second values.

12. The method of claim 1, wherein the non-transitive ranking relations represented by the computed first and second values include the first player ranked higher than the second player, the second player ranked higher than the third player, and the third player ranked higher than the first player.

13. The method of claim 1, wherein each of the at least three components associated with the first, second and third players represents the respective player's game performance.

14. The method of claim 1, wherein the function used to compute the first and second values is a monotonic function.

15. The method of claim 1, wherein the first value is computed as a sum of a plurality of sub-values, each sub-value determined by a monotonic function of corresponding score components associated with the first player and the second player; and the second value is computed as a sum of a plurality of sub-values, each sub-value determined by the monotonic function of corresponding score components associated with the second player and the third player.

16. The method of claim 1, wherein the first and second values are computed based on a determinative process.

17. A method for selecting at least one item from a set of items, a multicomponent score being associated with each item of the set of items, the method comprising:

for at least a first item and a second item of the set of items, computing, by a processor connected to a memory, a value characterising a relative ranking relation between the first item and the second item of the set of items, the value being computed as a function of a plurality of score components associated with each of the first item and the second item; and selecting, based on the computed value, at least one item from the set of items, wherein a score function used to compute the computed value is such that relations between items of the set of items, as characterized by computed values, are non-transitive, and the score function is chosen among the following score functions:

$$S_{(A,B)} = \frac{1}{m}\left(\sum_{j=1}^{m} \frac{S_B^j}{S_A^j + S_B^j}\right);$$

$$S_{(A,B)} = \sum_{j=1}^{m} \frac{S_B^j}{S_A^j}; \text{ and}$$

$$S_{(A,B)} = \sum_{j=1}^{m} e^{S_B^j - S_A^j};$$

wherein the multicomponent score associated with each item of the set of items comprises m components, $S_A^j$ representing component j of the multicomponent score associated with the first item, $S_B^j$ representing component j of the multicomponent score associated with the second item, and $S_{(A,B)}$ representing the computed value.

18. A method for selecting at least one player groups from a set of player groups to play a game, a multicomponent score being associated with each player group of the set of player group, the method comprising:

for a first player group of the set of player groups, computing, by a processor connected to a memory, a first value based on both (a) a multicomponent score associated with the first player group and (b) a multicomponent score associated with an identified player, the processor computing the first value as a function of at least three components of the multicomponent scores associated with the first player group and the identified player;

for a second player group of the set of player groups, computing, by the processor connected to the memory, a second value based on both (a) a multicomponent score associated with the second player group and (b) a multicomponent score associated with the identified player, the processor computing the second value as a function of at least three components of the multicomponent scores associated with the second player group and the identified player, the computed first and second values representing non-transitive ranking relations between the first player group, the second player group and the identified player; and selecting, based on the computed first and second values, between player groups of the set of player groups to play a game.

19. The method of claim 18 wherein the multicomponent score associated with the first player group is computed as a function of multicomponent scores associated with players of the first player group.

20. The method of claim 18 wherein the multicomponent score associated with the first player group is computed as a function of multicomponent scores associated with players of the first player group and contribution of the multicomponent score of each player in the first player group to the multicomponent score associated with the first player group is weighted based on a role of the player in the first player group.

21. A non-transitory storage medium storing a computer program to be executed by a programmable apparatus, the computer program comprising instructions, when executed by the programmable apparatus, cause the programmable apparatus to:

for a first player of a set of players, compute a first value based on both (a) at least three values of a multicomponent score associated with the first player and (b) at least three values of a multicomponent score associated with a second player different from the first player;

for the second player of the set of players, compute a second value based on both (a) at last three values of multicomponent score associated with the second player and (b) at least three values of a multicomponent score associated with a third player different from the first and second players, the first and second values representing non-transitive ranking relations between the first player, the second player and the third player of the set of players; and select, based on the computed first and second values, between players of the set of players to play a game.

22. A device comprising a processor connected to a memory, the processor being configured at least to:

for a first player of a set of players, compute a first value based on both (a) at least three components of multicomponent score associated with the first player and (b) at least three components of a multicomponent score associated with a second player different from the first player;

for the second player of the set of players, compute a second value based on both (a) at least three components of the multicomponent score associated with the second player and (b) at least three components of a multicomponent score associated with a third player different from the first and second players, the first and second values representing non-transitive ranking relations between the first player, the second player and the third player of the set of players; and select, based on the computed first and second values, between players of the set of players to play a game.

* * * * *